US012691019B2

(12) United States Patent
Nguyen et al.

(10) Patent No.: US 12,691,019 B2
(45) **Date of Patent: *Jul. 28, 2026**

(54) PRONE HEAD SUPPORT

(71) Applicant: Allen Medical Systems, Inc., Batesville, IN (US)

(72) Inventors: Hung D. Nguyen, Worcester, MA (US); Andrew R. Marchand, North Billerica, MA (US); Mary Kelly Chance, Worcester, MA (US); Christopher B. Dubois, Lincoln, RI (US)

(73) Assignee: Allen Medical Systems, Inc., Batesville, IN (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/676,928

(22) Filed: May 29, 2024

(65) Prior Publication Data

US 2025/0000729 A1 Jan. 2, 2025

Related U.S. Application Data

(60) Provisional application No. 63/524,377, filed on Jun. 30, 2023.

(51) Int. Cl.
*A61G 7/07* (2006.01)

(52) U.S. Cl.
CPC ........ *A61G 7/072* (2013.01); *A61G 2200/325* (2013.01)

(58) Field of Classification Search
None
See application file for complete search history.

(56) References Cited

U.S. PATENT DOCUMENTS 6,023,800 A * 2/2000 Stickley ............... A61G 7/0507 5/503.1
6,112,333 A 9/2000 Mazzei
(Continued)

FOREIGN PATENT DOCUMENTS

CN 105919767 A 9/2016
CN 106943271 A 7/2017
(Continued)

OTHER PUBLICATIONS

Final Office Action mailed on Dec. 3, 2025, in U.S. Appl. No. 19/246,787 (18 pages).

*Primary Examiner* — Adam C Ortiz
(74) *Attorney, Agent, or Firm* — Barnes & Thornburg LLP

(57) ABSTRACT

A prone head support includes a cushion to support a face of a patient in a prone position. The cushion has a cutout to accommodate the patient's eyes, nose, and mouth. A shell cradles the cushion and has downwardly extending bosses. The shell has an opening beneath the cutout. A tray includes a base panel and upstanding posts molded integrally with the base panel. A knob is threaded onto each upstanding post and each knob is rotatable relative to the upstanding post to move upwardly and downwardly along the respective upstanding post. The bosses of the shell rest on the knobs such that the shell is able to be freely lifted upwardly off of the knobs regardless of the position of the knobs along the respective upstanding posts.

20 Claims, 11 Drawing Sheets

(56) References Cited

U.S. PATENT DOCUMENTS

| | | | | |
|---|---|---|---|---|
| 6,490,737 | B1 * | 12/2002 | Mazzei | A61G 13/12 2/9 |
| 7,117,551 | B1 | 10/2006 | Dinkler, II et al. | |
| 7,424,759 | B2 | 9/2008 | Damron | |
| 7,426,763 | B2 | 9/2008 | Mazzei et al. | |
| 8,234,731 | B2 | 8/2012 | Skripps | |
| 8,261,385 | B2 | 9/2012 | Mazzei et al. | |
| 8,360,066 | B2 | 1/2013 | Piontek | |
| 8,549,683 | B2 | 10/2013 | Ratner | |
| 9,138,087 | B2 | 9/2015 | Mobley et al. | |
| 10,201,240 | B1 | 2/2019 | Arrighi | |
| 10,470,959 | B2 | 11/2019 | Le | |
| 10,842,206 | B2 | 11/2020 | Kaforey et al. | |
| 11,497,670 | B2 | 11/2022 | Le | |
| 11,529,276 | B2 | 12/2022 | Kaikenger et al. | |
| 2006/0255220 | A1 * | 11/2006 | Skripps | A61G 13/04 248/228.4 |
| 2009/0025146 | A1 * | 1/2009 | Mazzei | A61G 13/121 348/78 |
| 2012/0124742 | A1 * | 5/2012 | Soto | A61G 13/121 5/600 |
| 2018/0235824 | A1 | 8/2018 | Nordgren et al. | |
| 2019/0298597 | A1 | 10/2019 | Ito | |
| 2020/0108275 | A1 | 4/2020 | Nordgren et al. | |
| 2021/0137761 | A1 | 5/2021 | DeSilets et al. | |
| 2022/0125653 | A1 | 4/2022 | Kaikenger et al. | |

FOREIGN PATENT DOCUMENTS

| | | | | |
|---|---|---|---|---|
| CN | 107625609 | A | 1/2018 | |
| CN | 110559144 | B | 12/2019 | |
| CN | 21109571 | U | 7/2020 | |
| KR | 20200087666 | A * | 7/2020 | H04L 9/50 |
| WO | 2021233691 | A1 | 11/2021 | |

* cited by examiner

PRONE HEAD SUPPORT

The present application claims the benefit, under 35 U.S.C. § 119(e), of U.S. Provisional Patent Application No. 63/524,377, filed Jun. 30, 2023, which is hereby expressly incorporated by reference herein.

BACKGROUND

The present disclosure relates to a prone head support used during surgery. More particularly, the present disclosure relates to a prone head support having a disposable foam cushion with cutouts to support a patient's face while in a prone position and an underlying support tray and concave shell that supports the foam cushion.

Prone head supports are used during surgery, including during spine surgery, to support a patient's face while the patient is in a face-down or prone position. One such prior art device is the PRONEVIEW® Protective Helmet System marketed by Mizuho OSI of Union City, California. Aspects of the PRONEVIEW® Protective Helmet System may be found, for example, in U.S. Pat. Nos. 6,112,333; 6,490,737; 7,426,763; 8,261,385; 10,470,959; and 11,497,670. In the PRONEVIEW® device, four adjustable knobs are supported on corner regions of a rectangular mirror such that forces acting on the knobs during surgery may be transferred to the mirror thereby risking cracking or breaking the mirror. Furthermore, the PRONEVIEW® device has threaded metal posts that rotate with the knobs and that are received by threaded nuts fixed within bosses extending downwardly from a cushion support. Thus, to tilt the PRONEVIEW® device in the lateral or longitudinal directions, or both, at least two knobs must be adjusted by a user. Thus, a need exists for improvements in the field of prone head supports.

SUMMARY

An apparatus, system, or method may comprise one or more of the features recited in the appended claims and/or the following features which, alone or in any combination, may comprise patentable subject matter:

According to a first aspect of the present disclosure, a prone head support may include a cushion that may be configured to support a face of a patient in a prone position. The cushion may have a cutout that may be configured to accommodate the patient's eyes, nose, and mouth. The prone head support also may include a shell that may have a main portion that may be configured to cradle the cushion and a plurality of bosses that may extend downwardly from the main portion. The main portion of the shell may include an opening beneath the cutout. The prone head support further may include a tray that may have a base panel and a plurality of upstanding posts that may be molded integrally with the base panel and that may extend upwardly therefrom. Still further, the prone head support may include a plurality of adjusters. Each adjuster may be mounted on a respective one of the upstanding posts of the plurality of upstanding posts and may be movable upwardly and downwardly along the respective upstanding post. Each boss of the shell may rest on a respective adjuster such that the shell may be able to be freely lifted upwardly off of the plurality of adjusters regardless of the position of the adjusters along the respective upstanding posts.

In some embodiments of the first aspect, each upstanding post of the plurality of upstanding posts may include a helical thread and each adjuster may include a knob that may have a bore with a threaded portion that may interface with the helical thread of the respective upstanding post. Each knob may include a grip portion that may have an upwardly facing shoulder surface. Optionally, each knob may also have and a generally cylindrical protrusion that may extend upwardly from the grip portion. Further optionally, each boss may include an internal chamber in which a respective generally cylindrical protrusion may be received. In such embodiments, a lower end of each boss may rest atop the upwardly facing shoulder surface of the respective grip portion.

If desired, each boss of the prone head support of the first aspect may include a generally cylindrical wall and an annular flange that may be at a lower end of the generally cylindrical wall and that may extend inwardly therefrom. Also if desired, each annular flange may have a generally circular inside edge that may have a first diameter that may be larger than a second diameter of the respective generally cylindrical protrusion of the knob to provide a gap between the generally circular inside edge and the associated generally cylindrical protrusion.

In some embodiments of the first aspect, the prone head support further may include a stop that may be coupled to each upstanding post to prevent the knob from being removable from the respective upstanding post. Optionally, each stop may include a pin that may be oriented generally perpendicular to the respective upstanding post and that may have at least one end extending outwardly from the respective upstanding post. For example, each upstanding post may have a hole therein and the respective pin may be press fit into the corresponding hole. Furthermore, each hole may extend all the way through the respective upstanding post. The present disclosure contemplates that each upstanding post may include a bore that may extend generally coaxially therethrough and each hole may communicate with the respective bore. For example, each hole may include first and second hole portions that may be on opposite sides of the respective bore and each pin may extend through the bore between the first and second hole portions.

If desired, each upstanding post of the first aspect may include a threaded portion and an enlarged annular shoulder at its bottom end that may be interposed between the threaded portion and the base panel. In such embodiments, each adjuster may threadedly engage the threaded portion and may bottom out against an upper surface of the annular shoulder when rotated relative to the upstanding post into a lowered position.

Optionally, the tray of the first aspect further may include first and second channel portions that may be formed integrally with the base panel at opposite sides of the base panel. Further optionally, the first and second channel portions may have open bottoms to permit the tray to be placed downwardly upon spaced apart rails of a surgical support apparatus with the spaced apart rails being received within channels of the respective first and second channel portions.

In some embodiments, the prone head support of the first aspect further may include first and second friction pads that may be located within the channels of the respective first and second channel portions. The first and second friction pads may be configured to inhibit sliding movement of the tray along the spaced apart rails of the surgical support apparatus, for example. If desired, the first and second friction pads may be mounted to a corresponding undersurface of a respective top wall of the associated first and second channel portions. The present disclosure contemplates that the first and second friction pads of the first aspect may include rubber friction pads. Optionally, the tray of the first aspect may be formed to include first and second stiffening ramps that may be molded integrally therewith and situated between an inwardly facing sidewall of the respective first and second channel members and the base panel.

The present disclosure further contemplates that the prone head support of the first aspect further may include a mirror that may be coupled to the base panel of the tray beneath the opening. Optionally, at least one of the upstanding posts of the tray may be outboard of a head end perimeter edge of the mirror, and at least another of the upstanding posts of the tray may be outboard of a foot end perimeter edge of the mirror. Further optionally, the prone head support of the first aspect further may include a resilient gasket that may be interposed between the mirror and the base panel of the tray. For example, the resilient gasket may include a rubber sheet that may underlie the mirror. If desired, the mirror and the resilient gasket each may include a plurality of apertures through which fastening screws may extend into respective threaded holes that may be formed in the base panel of the tray.

According to a second aspect of the present disclosure, a prone head support may include a cushion that may be configured to support a face of a patient in a prone position. The cushion may have a cutout configured to accommodate the patient's eyes, nose, and mouth. The prone head support of the second aspect also may include a shell that may have a main portion that may be configured to cradle the cushion and that may have first, second, and third bosses that may extend downwardly from the main portion. The main portion of the shell may include an opening beneath the cutout. The first boss may be situated beneath a forehead supporting portion of the shell midway between opposite sides of the shell. The second and third bosses may be spaced apart with a chin supporting portion of the shell extending between the second and third bosses. The prone head support of the second aspect further may have a tray that may include a base panel and first, second, and third upstanding posts that may be molded integrally with the base panel and that may extend upwardly therefrom. The first, second, and third upstanding posts may be situated so as to align with the first, second, and third bosses of the shell when the shell is placed atop the tray. Still further, the prone head support of the second aspect may include first, second, and third adjusters that may be mounted on respective first, second, and third upstanding posts. Each of the first, second, and third adjusters may be movable upwardly and downwardly along the respective first, second, and third upstanding post and each of the first, second, and third bosses of the shell may rest on a respective first, second, and third adjuster.

In some embodiments of the second aspect, each of the first, second, and third upstanding posts may include a helical thread and the first, second, and third adjusters each may comprise a knob having a bore with a threaded portion that may interface with the helical thread of the respective first, second, and third upstanding post. Optionally, each knob may include a grip portion that may have an upwardly facing shoulder surface and a generally cylindrical protrusion that may extend upwardly from the grip portion. Further optionally, each of the first, second, and third bosses may include an internal chamber in which a respective generally cylindrical protrusion may be received. Alternatively or additionally, a lower end of each of the first, second, and third bosses may rest atop the upwardly facing shoulder surface of the respective grip portion.

If desired, each of the first, second, and third bosses may include a generally cylindrical wall and an annular flange that may be at a lower end of the generally cylindrical wall and that may extend inwardly therefrom. Also if desired, each annular flange may have has a generally circular inside edge that may have a first diameter that may be larger than a second diameter of the associated generally cylindrical protrusion of the respective knob to provide a gap between the generally circular inside edge and the associated generally cylindrical protrusion.

In some embodiments of the second aspect, the prone head support further may include first, second, and third stops that may be coupled to respective first, second, and third upstanding posts to prevent the associated knob from being removable from the respective first, second, and third upstanding post. Optionally, each of the first, second, and third stops may include a pin that may be oriented generally perpendicular to the respective first, second, and third upstanding post and each pin may have at least one end that may extend outwardly from the respective first, second, and third upstanding post. For example, each of the first, second, and third upstanding posts may have a hole therein and the respective first, second, and third pin may be press fit into the corresponding hole. The present disclosure further contemplates that each of the first, second, and third upstanding posts may include a bore that may extend generally coaxially therethrough and each hole may communicate with the respective bore. For example, each hole may include first and second hole portions that may be on opposite sides of the respective bore and each pin may extend through the bore between the first and second hole portions.

If desired, each of the first, second, and third upstanding posts of the second aspect may include a threaded portion and an enlarged annular shoulder at its bottom end that may be interposed between the threaded portion and the base panel. In such embodiments, each of the first, second, and third adjusters may threadedly engage the respective threaded portion and may bottom out against an upper surface of the respective annular shoulder when rotated relative to the respective first, second, and third upstanding post into a corresponding lowered position.

Optionally, the tray of the second aspect further may include first and second channel portions that may be formed integrally with the base panel at opposite sides of the base panel. Further optionally, the first and second channel portions may have open bottoms to permit the tray to be placed downwardly upon spaced apart rails of a surgical support apparatus with the spaced apart rails being received within channels of the respective first and second channel portions.

In some embodiments, the prone head support of the second aspect further may include first and second friction pads that may be located within the channels of the respective first and second channel portions. The first and second friction pads may be configured to inhibit sliding movement of the tray along the spaced apart rails of the surgical support apparatus, for example. If desired, the first and second friction pads may be mounted to a corresponding undersurface of a respective top wall of the associated first and second channel portions. The present disclosure contemplates that the first and second friction pads of the second aspect may include rubber friction pads. Optionally, the tray of the second aspect may be formed to include first and second stiffening ramps that may be molded integrally therewith and situated between an inwardly facing sidewall of the respective first and second channel members and the base panel.

The present disclosure further contemplates that the prone head support of the second aspect further may include a mirror that may be coupled to the base panel of the tray beneath the opening. Optionally, the first upstanding post may be situated outboard of a head end perimeter edge of the mirror and the second and third upstanding posts may be situated outboard of a foot end perimeter edge of the mirror. Further optionally, the prone head support of the second aspect further may include a resilient gasket that may be interposed between the mirror and the base panel of the tray. For example, the resilient gasket of the second aspect may include a rubber sheet that may underlie the mirror. If desired, the mirror and the resilient gasket of the second aspect each may include a plurality of apertures through which fastening screws may extend into respective threaded holes that may be formed in the base panel of the tray. With regard to the prone head support of the second aspect, the shell may be freely liftable upwardly off of the first, second, and third adjusters regardless of the position of the first, second, and third adjusters along the respective first, second, and third upstanding posts.

According to a third aspect of the present disclosure, a method of making a prone head support may include molding a tray to have a base panel and to have a plurality of upstanding posts that may be formed integrally with the base panel and that may extend upwardly therefrom. The method further may include mounting a plurality of adjusters on the plurality of upstanding posts, placing a shell on the adjusters such that the shell may be able to be freely lifted upwardly off of the plurality of adjusters regardless of a position of the adjusters along the respective upstanding posts, and placing a cushion on the shell. The cushion of the third aspect may be configured to support a face of a patient in a prone position. The cushion of the third aspect may have a cutout that may be configured to accommodate the patient's eyes, nose, and mouth. The shell of the third aspect may have a main portion that may be configured to cradle the cushion and may have a plurality of bosses that may extend downwardly from the main portion and that may rest upon the plurality of adjusters. The main portion of the shell may include an opening beneath the cutout.

In some embodiments, the method further may include forming a helical thread on each upstanding post of the plurality of posts. In such embodiments, each adjuster may include a knob having a bore with a threaded portion. Accordingly, mounting the plurality of adjusters on the plurality of upstanding posts may include interfacing the threaded portion of each knob with the helical thread of the respective upstanding post. If desired, each adjuster may include a knob and placing the shell on the adjusters may include placing bottoms of the bosses of the shell on upwardly facing surfaces of grip portions of the knobs. Optionally, each boss may include an internal chamber and placing the shell on the adjusters further may include moving the shell downwardly so that generally cylindrical protrusions extending upwardly from respective grip portions may be received in the internal chambers of the bosses of the shell.

Optionally, the method of the third aspect further may include coupling a stop to each upstanding post to prevent the knob from being removable from the respective upstanding post. If desired, each stop may include a pin that may be oriented generally perpendicular to the respective upstanding post and coupling the stops to the upstanding posts may include coupling the pins to the upstanding posts so that at least one of end of each pin may extend outwardly from the respective upstanding post. Also if desired, the method of the third aspect further may include forming holes in the upstanding posts and coupling the pins to the upstanding posts may include press fitting the pins into the holes. For example, forming the holes in the upstanding posts may include forming the holes to extend all the way through the respective upstanding posts.

In some embodiments, molding the tray may include forming a bore that may extend generally coaxially through each respective upstanding post. In such embodiments, each hole may communicate with the respective bore. For example, forming the holes may include forming first and second hole portions that may be on opposite sides of the respective bore and coupling the pins to the upstanding posts may include inserting the pins through the respective first and second hole portions and through the respective bores.

Optionally, forming the tray of the third aspect may include forming enlarged annular shoulders that may be situated at bottom ends of the upstanding posts adjacent the base panel. Further optionally, forming the tray of the third aspect may include forming first and second channel portions integrally with the base panel at opposite sides of the base panel. In such embodiments, the first and second channel portions may have open bottoms to permit the tray to be placed downwardly upon spaced apart rails of a surgical support apparatus with the spaced apart rails being received within channels of the respective first and second channel portions.

The present disclosure contemplates that the method of the third aspect further may include coupling first and second friction pads to the respective first and second channel portions within the channels. The first and second friction pads may be configured to inhibit sliding movement of the tray along the spaced apart rails of the surgical support apparatus, for example. If desired, coupling the first and second friction pads to the respective first and second channel portions may include mounting the first and second friction pads to a corresponding undersurface of a respective top wall of the associated first and second channel portions. Also if desired, forming the tray may include forming first and second stiffening ramps that may be situated between an inwardly facing sidewall of the respective first and second channel members and the base panel.

In some embodiments, the method of the third aspect further may include coupling a mirror to the base panel of the tray beneath the opening such that at least one of the upstanding posts of the tray may be outboard of a head end perimeter edge of the mirror and such that at least another of the upstanding posts of the tray may be outboard of a foot end perimeter edge of the mirror. Optionally, the method of the third aspect further may include interposing a resilient gasket between the mirror and the base panel of the tray. Further optionally, the resilient gasket may include a rubber sheet that may underlie the mirror. Still further optionally, the method of the third aspect further may include fastening the mirror and the resilient gasket to base panel using fastening screws that may extend through apertures in the mirror and resilient gasket and that may extend into respective threaded holes that may be formed in the base panel of the tray. The present disclosure contemplates that molding the tray may include injection molding the tray.

Additional features, which alone or in combination with any other feature(s), such as those listed above, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which.

DETAILED DESCRIPTION

Figure 1:
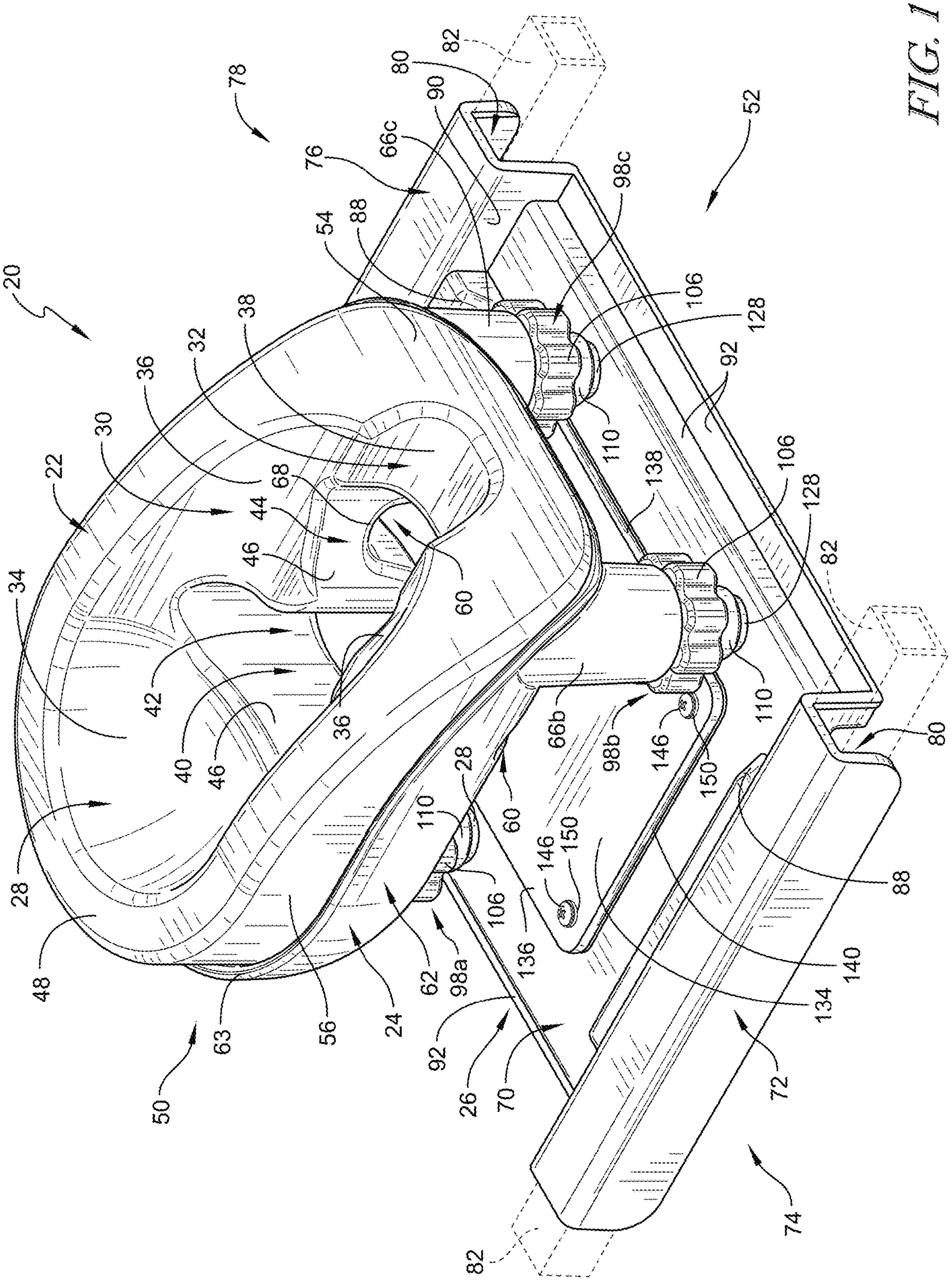
FIG. 1 is a perspective view of prone head support showing a foam cushion for supporting a patient's face, a shell beneath the foam cushion and configured to cradle the foam cushion, and a tray situated beneath the shell.

A prone head support 20 includes a foam cushion 22 for supporting a patient's face, a shell 24 located beneath foam cushion 22 and configured to cradle foam cushion 22, and a tray 26 situated beneath shell 24 as shown in FIG. 1. Cushion 22 and shell 24, in combination, are sometimes referred to in the art as a "surgical mask" or just a "mask." Cushion 22 includes a forehead-receiving recess 28 a pair of cheek-receiving recesses 30, and a chin-receiving recess 32. Recess 28 is defined by a concave forehead-supporting surface 34 and recesses 30 are defined by respective cheek-supporting surfaces 36. Surface 34 blends smoothly into surfaces 36. Recess 32 is defined by a U-shaped chin-supporting surface 38. Surface 38 dips downwardly from surfaces 36 in a somewhat abrupt manner at the junctions between surfaces 36, 38.

Cushion 22 is formed to include a generally T-shaped opening or cutout 40 that is located substantially midway between surfaces 30 and that extends downwardly from surfaces 30 all the way through cushion 22. Opening 40 includes an eye-accommodating portion 42 and a nose/mouth-accommodating portion 44. As their names imply, eye-accommodating portion 42 of opening 40 is sized and shaped to accommodate the eyes of a patient lying face down on cushion 22 and nose/mouth accommodating portion 44 is sized and shaped to accommodate the nose and mouth of the patient. In the illustrative embodiment, portion 44 widens in a direction from portion 42 towards chin-receiving recess 32. A sidewall 46 extends generally vertically downwardly through cushion 22 to define cutout 40 when cushion 22 is oriented generally horizontally as shown in FIG. 1.

Cushion 22 further has a generally upwardly facing perimeter surface 48 that slopes downwardly in a direction from a head end 50 of prone head support toward a foot end 52 thereof so as to transition smoothly into a rear surface 54. Cushion 22 has a sidewall 56 that extends vertically downwardly from surface 48 but that transitions smoothly into a generally rounded convex bottom surface 58 beneath forehead-supporting surface 34 as shown in FIGS. 7-10, for example. At the head end 50 of cushion 22, sidewall 56 is convex and generally semi-circular in a region just beneath upwardly facing perimeter surface 48. It will be appreciated that bottom surface 58 at the head end region of cushion 22 has a generally spherical contour that traverses over about a quarter of a sphere and then bottom surface 58 flattens out somewhat in the direction toward foot end 52. Cushion 22 is also formed to include a pair of arched passageways 60 that are open at bottom surface 58 and that extend laterally through cushion 22 from sidewall 56 to sidewall 46 of portion 44 of opening 40 in a region where a patient's mouth is generally located. Passageways 60 enhance access to the patient's mouth for breathing tubes and the like.

Figure 3:
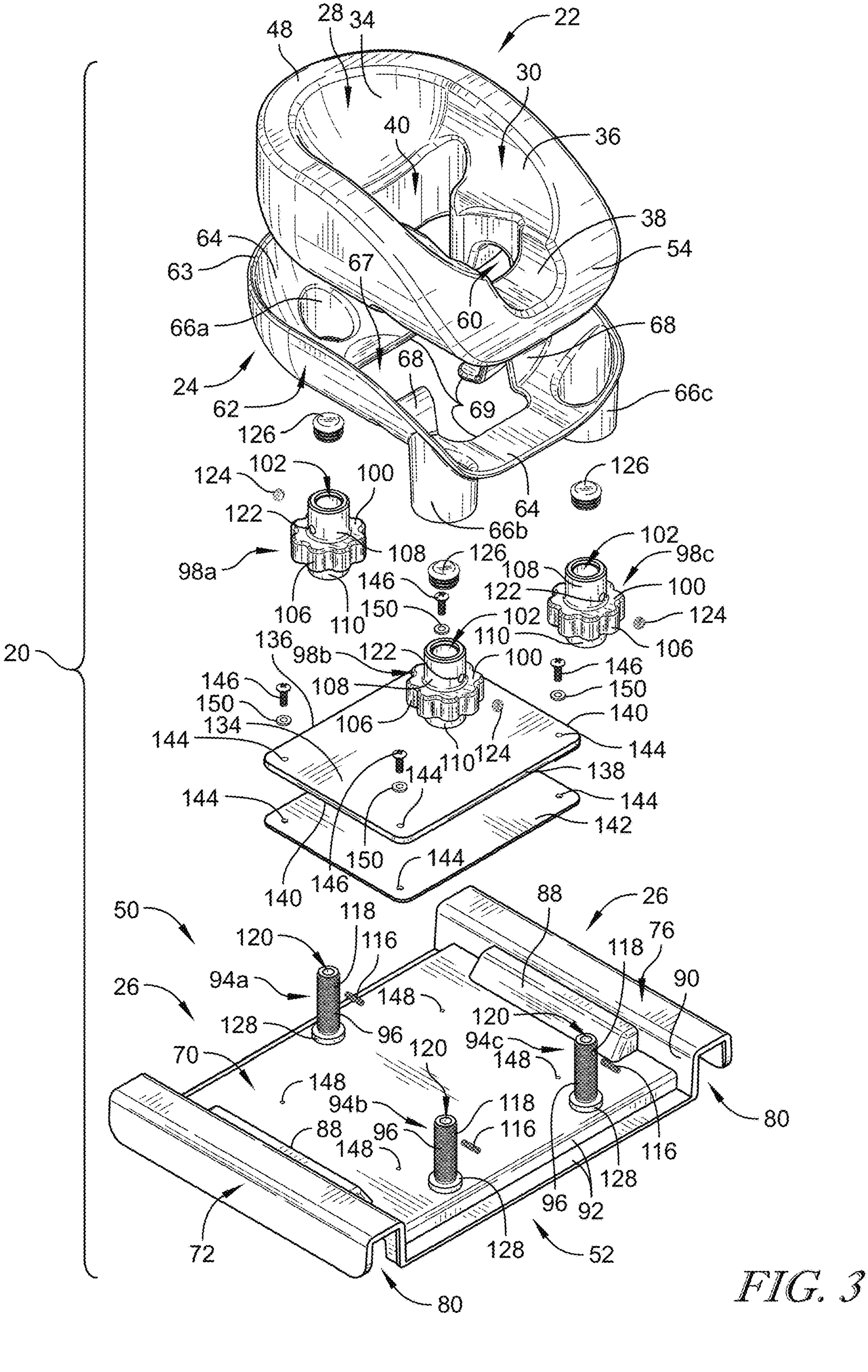
FIG. 3 is an exploded view of the prone head support of FIG. 1 showing the tray having a base panel formed integrally with three upstanding posts and with channel portions at opposite sides of the base panel, a mirror and gasket situated above the base panel, three knobs above the three posts, the shell having bosses situated above the three knobs, and the foam cushion situated above the shell.
Figure 5:
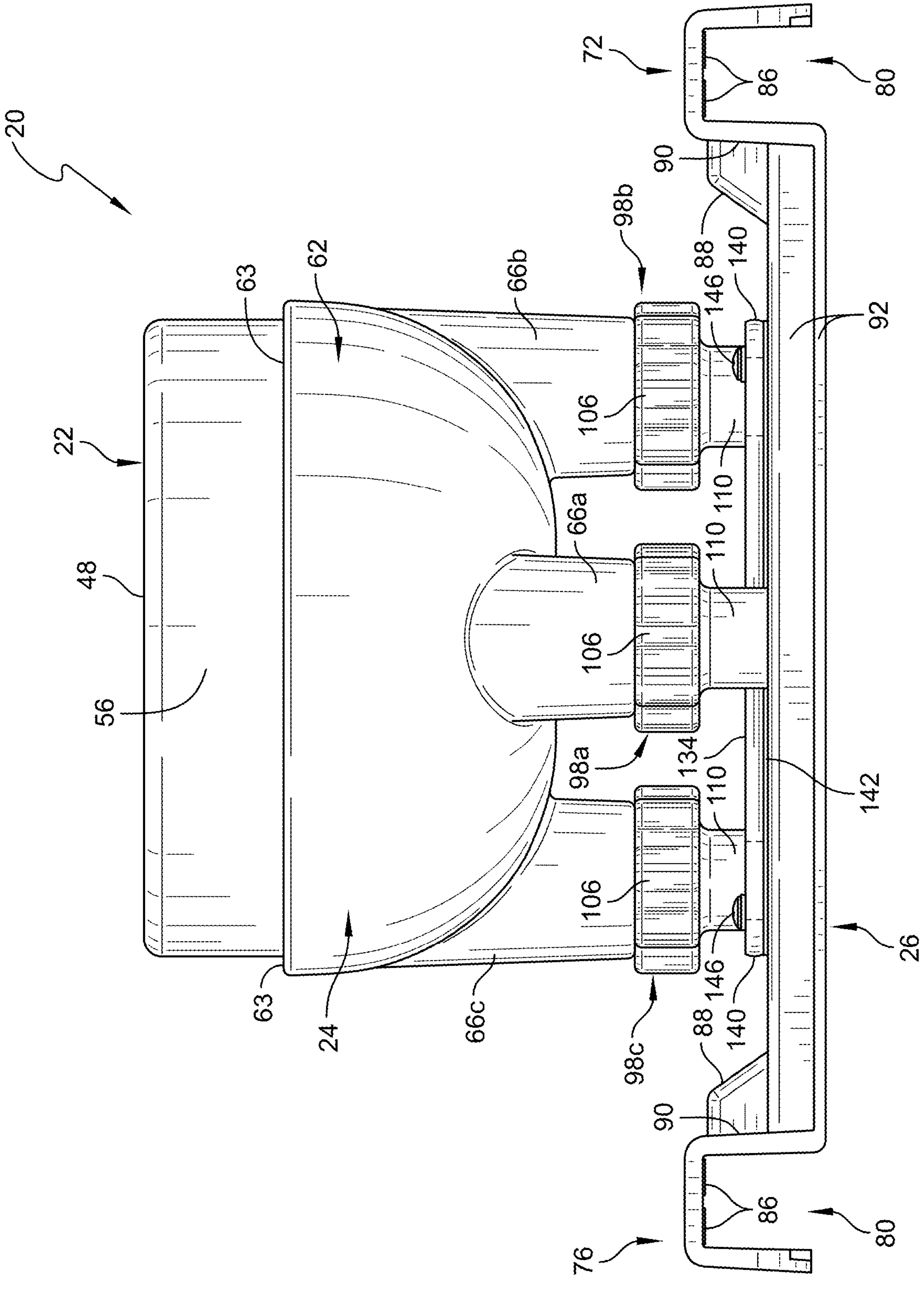
FIG. 5 is a head end elevation view of the prone head support of FIG. 1.
Figure 6:
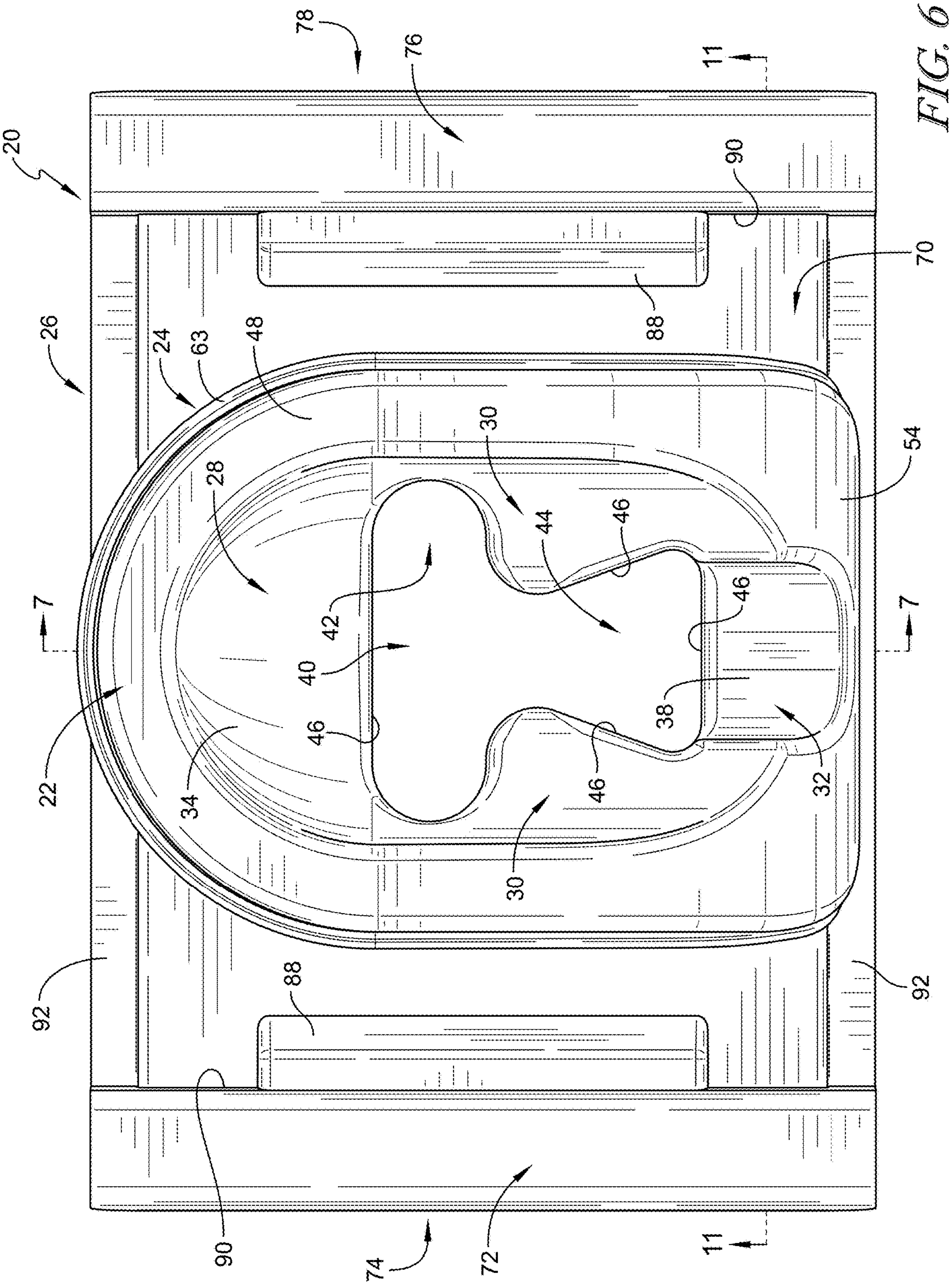
FIG. 6 is a top plan view of the prone head support of FIG. 1.
Figure 7:
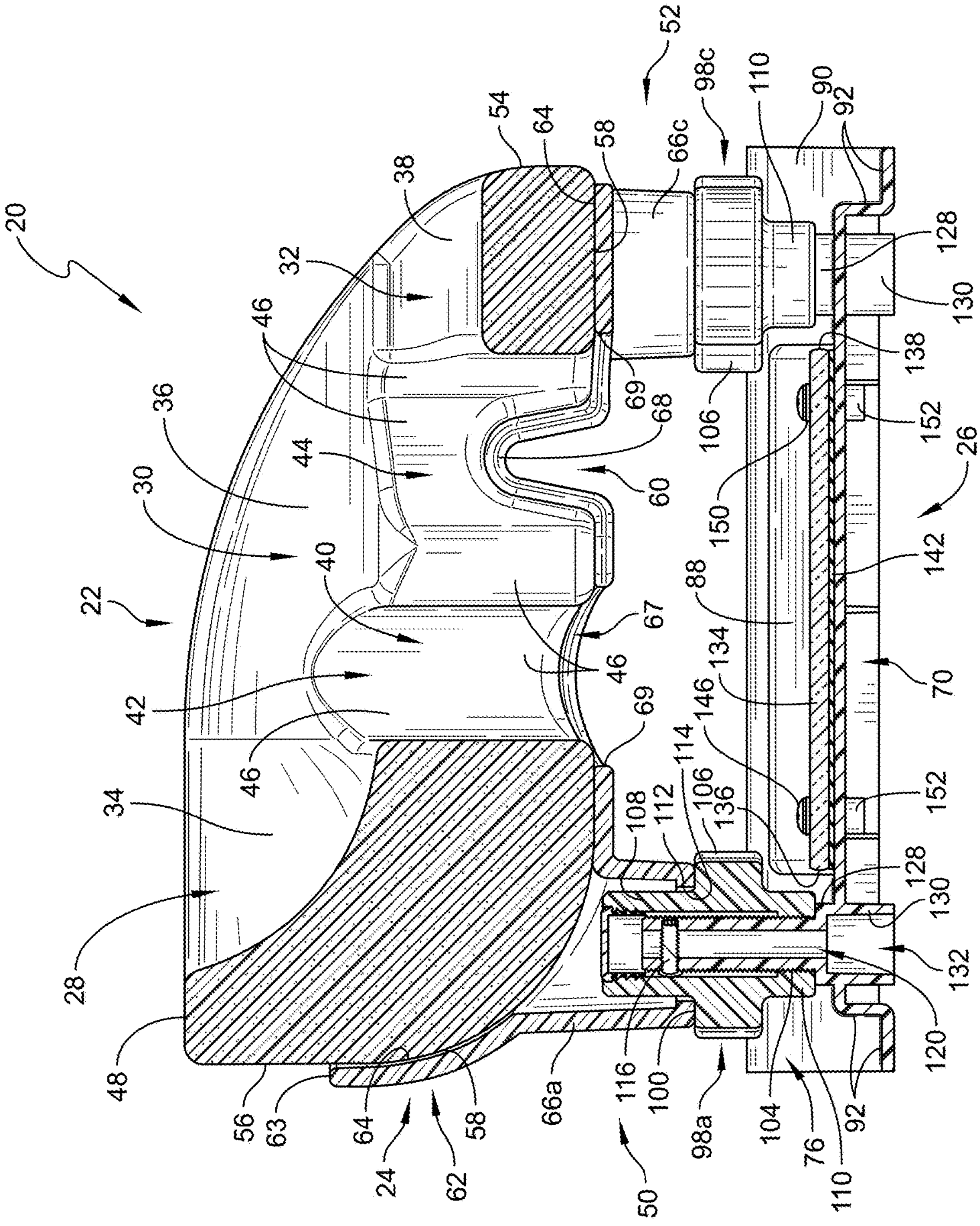
FIG. 7 is a cross sectional view, taken along line 7-7 of FIG. 6, showing a knob at the head end of the prone head support having a lower portion threaded onto the respective upstanding post, a grip portion in a mid-region of the knob, and a generally cylindrical protrusion extending upwardly from the grip portion into a chamber formed in a head end boss of the shell, showing a bottom of the boss resting on an upwardly facing surface of the grip portion of the knob, and showing a horizontally oriented pin at a top region of the upstanding post to serve as a stop to prevent the knob from being removable from the upstanding post.
Figure 11:
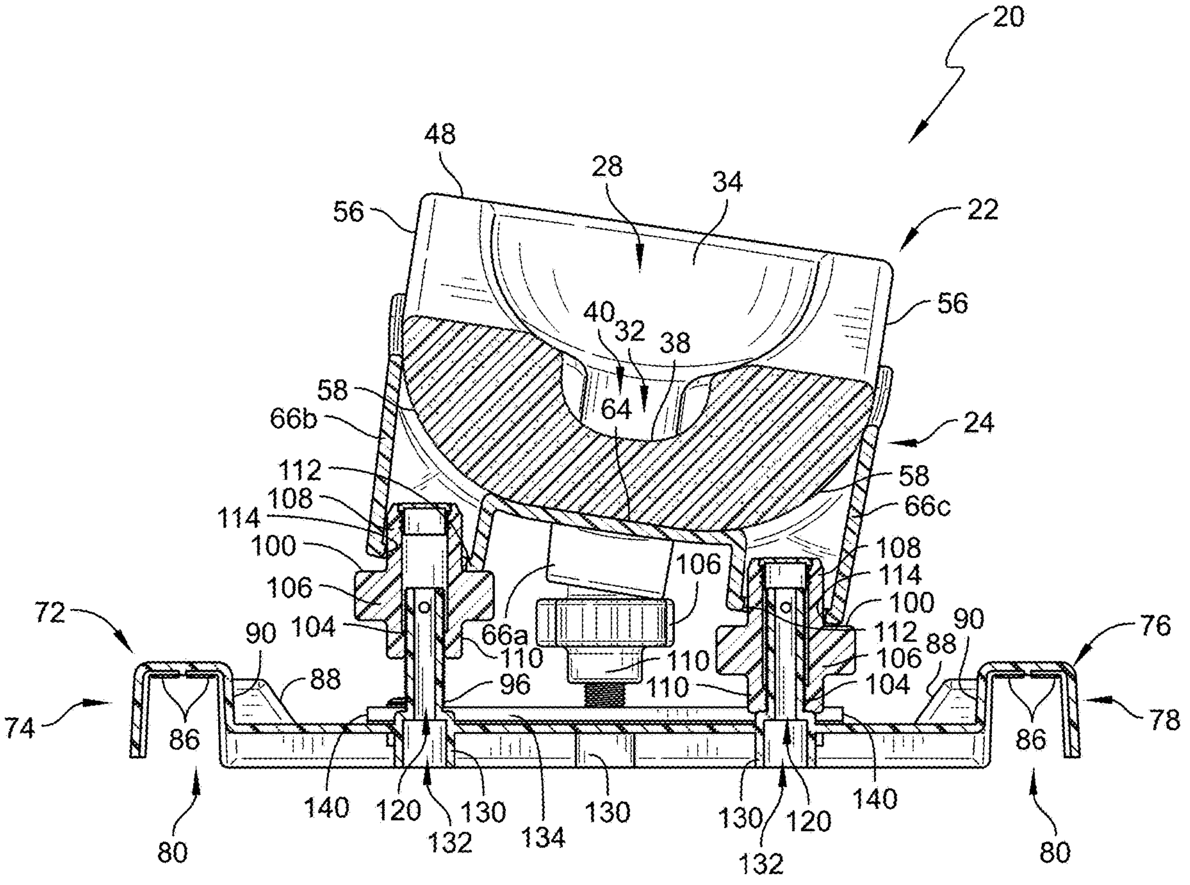
FIG. 11 is a cross sectional view, taken along line 11-11 of FIG. 6, showing the three knobs moved to support the shell and foam cushion in a maximum right lateral tilt position.

Shell 24 includes a main portion 62 having a generally upwardly facing cushion-support surface 64, shown in FIG. 3, and three generally cylindrical bosses **66*a*, 66*b*, 66*c* extending downwardly from main portion 62 as shown best in FIG. 5. Main portion 62 is shaped so at to follow the contour of the portion of side surface 56 and bottom surface 58 of cushion 22 with which cushion-supporting surface 64 of main portion 62 comes into contact. Upper ends of bosses 66*a*, 66*b*, 66*c* are each open at surface 64 as shown in FIG. 3. Bottom surface 58 of cushion 22 bridges across each of the open ends of bosses 66*a*, 66*b*, 66*c* in the illustrative embodiment as shown in FIGS. 7 and 11, for example. In other embodiments, cushion 22 if formed to include projections that extend downwardly into the interior regions of bosses 66*a*, 66*b*, 66*c* to further secure cushion 22 in place on shell 24**.

Figure 4:
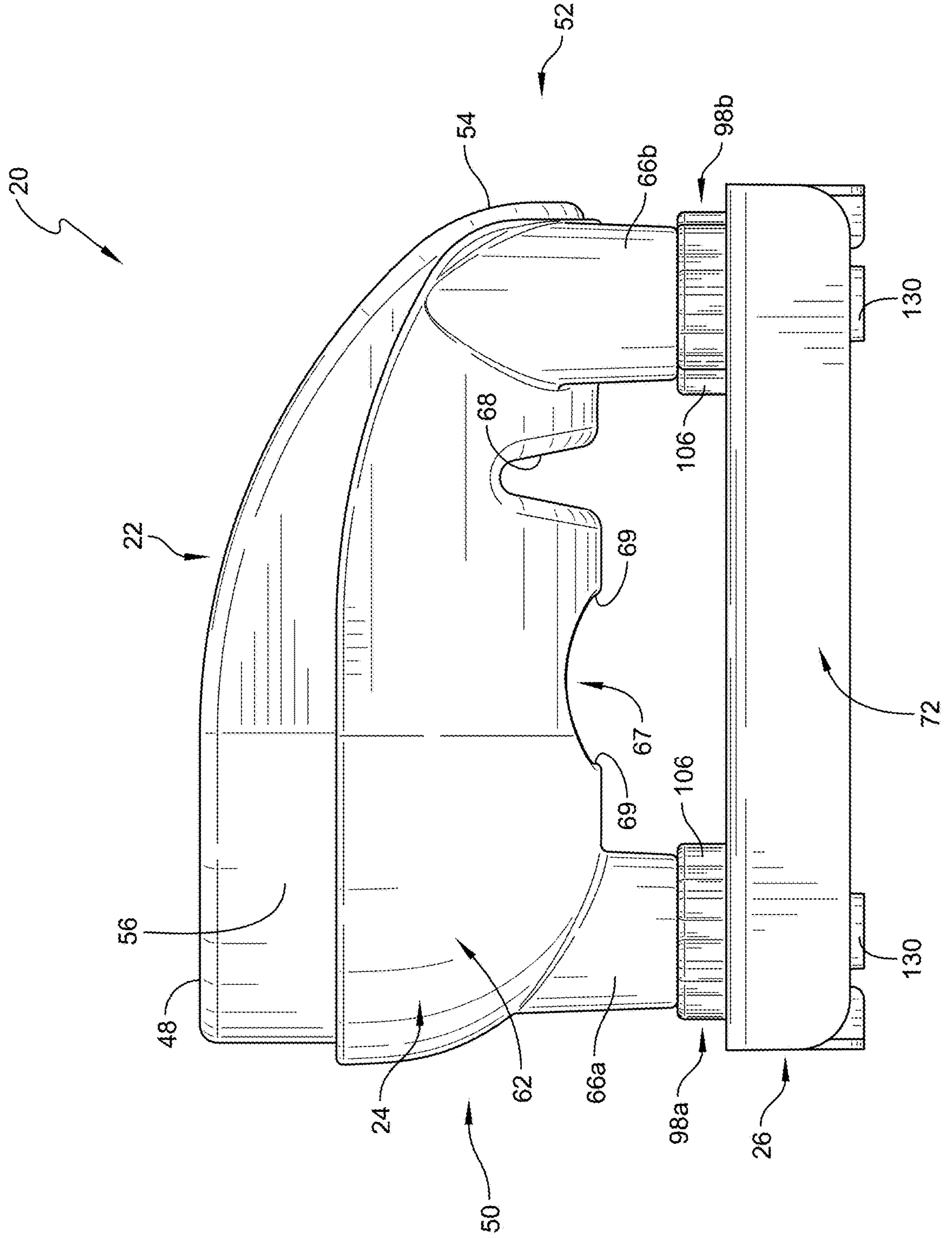
FIG. 4 is a side elevation view of the prone head support of FIG. 1.

Boss **66*a* is situated beneath a forehead supporting portion of shell 24 midway between opposite sides of shell 24. The forehead supporting portion of shell is the portion of shell 24 beneath surface 34 of cushion 22. Bosses 66*b*, 66*c* are spaced apart with a chin supporting portion (e.g., surface 64) of shell 24 extending therebetween. Main portion 62 of shell 24 extends only part way up side surface 56 of cushion 22 when cushion is supported on cushion-support surface 64 as shown in FIGS. 1, 4, and 5. Thus, the upper region of side surface 56 is exposed and unencumbered from flexing outwardly relative to an upper edge 63 of main portion 62 of shell 24 such as may occur if a patient's face is wider than any of recesses 28, 30, 32 of cushion 22**.

In the illustrative embodiment, main portion 62 of shell 24 further has arched walls 68 that are received in the arched passageways 60 of cushion 22. Upper surfaces of arched walls 68 are sized and configured to follow the contour of, and contact, the bottom surfaces that define the arched passageways of cushion 22. Thus, in the illustrative embodiment, it has been found that the receipt of arched walls 68 of shell 24 in the arched passageways 60 of cushion 22 are sufficient to secure cushion 22 in place on shell 24 so that cushion 22 is not able to slide off of shell 24 toward foot end 52 of prone head support 20. Of course, assuming no patient is being supported on cushion 22 of prone head support 20, cushion 22 is able to be lifted upwardly off of shell 24 for disposal, for example, or for any other desired purpose.

Main portion 62 of shell 24 is formed to include an opening 67 defined by an edge 69 that follows the shape of opening 40 in cushion 22 but that is slightly larger than opening 40 so that cushion 22 overhangs edge 69 by a slight amount (e.g., ¼ inch to ½ inch) as shown in FIGS. 7-10, for example. The overhang of cushion 22 beyond edge 69 permits more downward flexure of cushion 22 within opening 67 at edge 69 to reduce the interface pressure on the patient's face at the junction between surfaces 30, 32, 34 and surface 46 of opening 40 of cushion 22.

Referring once again to FIG. 1, tray 26 includes a base panel 70, a first channel portion 72 at a first side 74 of prone head support 20, and a second channel portion 76 at a second side 78 of prone head support 20. Channel portions 72, 76 are molded integrally with base panel 70. Channel portions 72, 76 are generally upside down U-shaped structures so as to have open bottoms. Channels 80 of channel portions 72, 76 are configured to receive respective spaced apart rails 82 of a surgical support apparatus as shown in FIG. 1 (in phantom). Such a surgical support apparatus is used for spinal surgery, for example. The open bottoms of channel portions 72, 76 permit the tray 26 to be placed downwardly upon spaced apart rails 82 of the surgical support apparatus with the spaced apart rails 82 being received within channels 80 of the respective first and second channel portions 72, 76.

Figure 2:
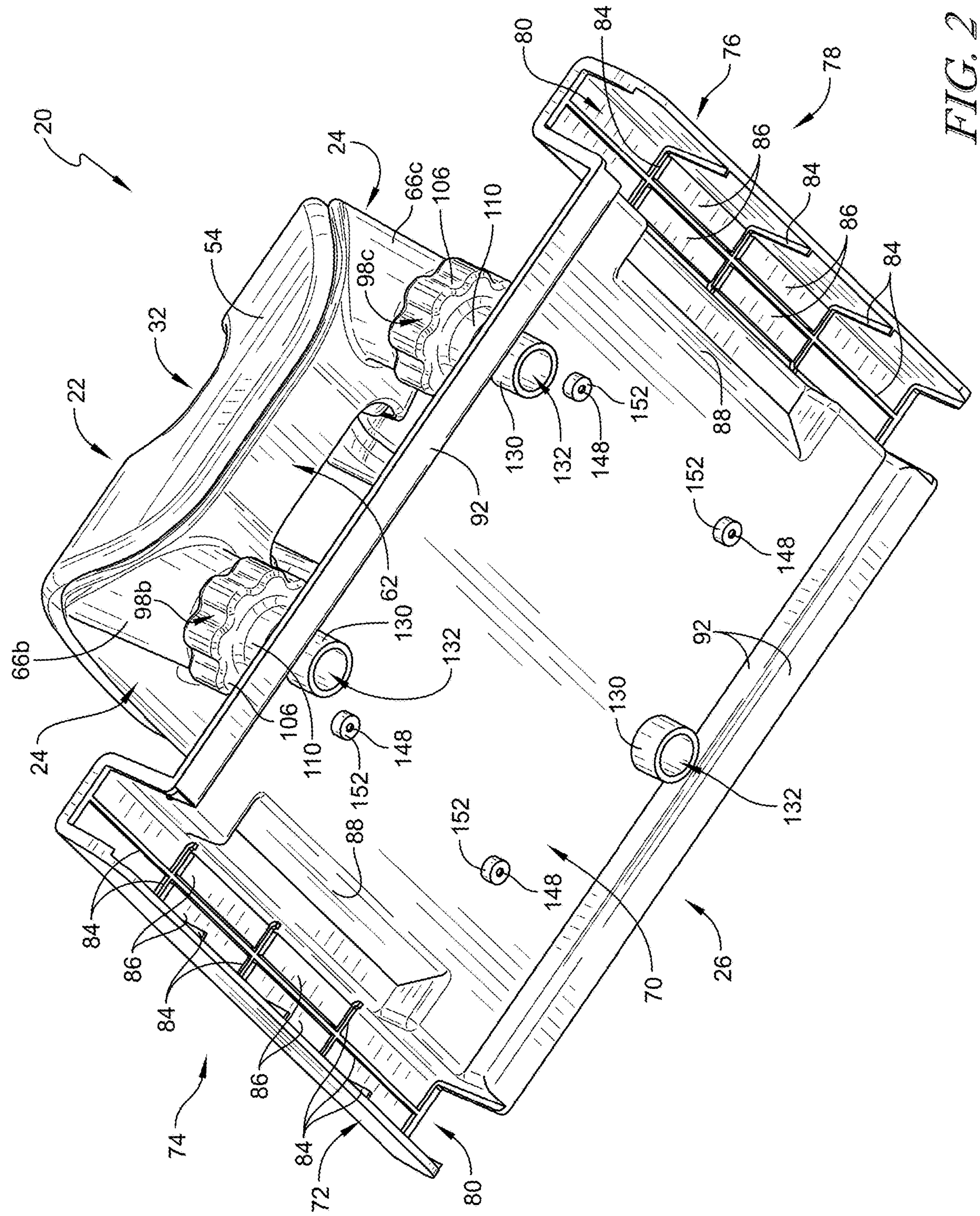
FIG. 2 is a perspective view of the prone head support of FIG. 1 showing an underside of the tray.

As shown in FIG. 2, a set of reinforcement ribs 84 are located on the underside of channel members 72, 76. Ribs 84 are molded integrally with channel members 72, 76 and serve to enhance the strength and rigidity of channel members 72, 76 by inhibiting unwanted deflection of channel members 72, 76. A set of four friction pads 86 are mounted within generally rectangular spaces provided by respective portions of ribs 84 of each channel member 72, 76 so that, in the illustrative embodiment, prone head support 20 has eight friction pads 86. Friction pads 86 extend downwardly beyond the bottoms of the adjacent ribs 84 and into channels 80, as shown in FIG. 5, so that pads 86 contact rails 82 of the associated surgical table to inhibit movement of prone head support 20 along rails 84 unless sufficient force is applied to prone head support 20 by a caregiver to overcome the frictional contact force of pads 86. When a patient's head is supported on cushion 22 of prone head support 20, friction pads 86 have an even greater contact force with rails 82 thereby further inhibiting movement of prone head support 20 along rails 82.

In some embodiments, friction pads 86 are made of rubber. While the illustrative example of FIG. 2 has four friction pads 86 coupled to each channel member 72, 76, a lesser number of friction pads 86 (e.g., zero, one, two, or three) or a greater number of friction pads 86 (e.g., 5, 6, 7, 8, or more) coupled to each channel member 72, 76 are within the scope of the present disclosure. To further enhance the strength and rigidity of channel members 72, 76 relative to base panel 70, tray 26 is formed to include first and second stiffening ramps 88 molded integrally therewith and situated between an inwardly facing sidewall 90 of the respective first and second channel members and the base panel 70. Base panel 70 includes stepped regions 92 of generally L-shaped cross section, as shown in FIG. 7, for example, which further contributes to the overall strength and rigidity of tray 26.

Tray 26 further includes three upstanding posts **94*a*, 94*b*, 94*c* molded integrally with base panel 70 and that extend upwardly therefrom as shown best in FIG. 3. Prone head support 20 includes three adjusters 98*a*, 98*b*, 98*c* that are mounted to respective posts 94*a*, 94*b*, 94*c* and that are movable upwardly and downwardly along the respective upstanding post. 94*a*, 94*b*, 94*c*. In the illustrative example, each upstanding post 94*a*, 94*b*, 94*c* is provided with a helical thread 96 as shown, for example, in FIGS. 3, 8, and 9. In some embodiments, threads 96 are formed during the molding process of tray 26 and in other embodiments, threads 96 are formed on posts 94*a*, 94*b*, 94*c* after tray 26 is molded, such as by use of thread cutting tool (aka a threading tool). Also in the illustrative example, adjusters 98*a*, 98*b*, 98*c* are embodied as knobs and so the present disclosure sometimes refers to knobs 98*a*, 98*b*, 98*c* herein. Knobs 98*a*, 98*b*, 98*c* are threadedly coupled to respective threaded posts 94*a*, 94*b*, 94*c* and are rotatable to move upwardly and downwardly on threaded posts 94*a*, 94*b*, 94*c***.

Upstanding posts **94*a*, 94*b*, 94*c* and adjusters 98*a*, 98*b*, 98*c* are aligned in registry with bosses 66*a*, 66*b*, 66*c*. respectively, of shell 24. Each boss 66*a*, 66*b*, 66*c* of shell 24 rests on an upwardly facing shoulder surface 100 of a respective adjuster 98*a*, 98*b*, 98*c* such that shell 24 is able to be freely lifted upwardly off of the plurality of adjusters 98*a*, 98*b*, 98*c* regardless of the position of the adjusters along the respective upstanding posts 94*a*, 94*b*, 94*c* as is apparent in FIGS. 7-11. In the illustrative example, each adjuster 98*a*, 98*b*, 98*c* is embodied as a knob having a bore 102, best shown in FIG. 3, with a threaded portion 104 that interfaces with the helical thread of the respective upstanding post 94*a*, 94*b*, 94*c* as shown in FIGS. 7-11. Adjusters 98*a*, 98*b*, 98*c* are sometimes referred to herein as knobs 98*a*, 98*b*, 98*c***, respectively.

Each knob **98*a*, 98*b*, 98*c* includes a grip portion 106 that includes upwardly facing shoulder surface 100. Grip portions 106 are undulated around their respective peripheries to enhance the ability of a user to grip the knobs 98*a*, 98*b*, 98*c*. Furthermore, each knob 98*a*, 98*b*, 98*c* has a generally cylindrical protrusion 108 extending upwardly from the respective grip portion 106 and another generally cylindrical protrusion 110 extending downwardly from the respective grip portion 106. Threaded portions 104 of knobs 98*a*, 98*b*, 98*c* are formed at the lower regions of protrusions 110 in the illustrative embodiment. Each boss 66*a*, 66*b*, 66*c* has an internal chamber in which a respective generally cylindrical protrusion 108 is received. Thus, the lower ends of each boss 66*a*, 66*b*, 66*c* are what rest atop the upwardly facing shoulder surface 100 of the respective grip portion 106**.

Each boss **66*a*, 66*b*, 66*c* of prone head support 20 is embodied as a generally cylindrical wall but each boss 66*a*, 66*b*, 66*c* also includes an annular flange 112 at a lower end of the corresponding generally cylindrical wall and that extends inwardly therefrom as shown, for example, in FIGS. 7-11. Each annular flange 112 has a generally circular inside edge 114 having a first diameter that is larger than a second diameter of the respective generally cylindrical protrusion 108 of the respective knob 98*a*, 98*b*, 98*c* to provide a gap between the generally circular inside edge 114 and the associated generally cylindrical protrusion 108. Thus, a slight amount of clearance (e.g., about 1/16 inch to about ⅛ inch) is provided between generally circular edges 114 of bosses 66***a*, 66*b*, 66*c* and protrusion 108 of respective knobs 98*a*, 98*b*, 98*c*. This clearance accommodates tilting movement of shell 24 and cushion 22 relative to tray 26. For example, by rotatably raising or lowering knobs 98*a*, 98*b*, 98*c* on corresponding threaded posts 94*a*, 94*b*, 94*c*, shell 24 and cushion 22 are movable between either a lowered horizontal position, shown in FIG. 7, or a raised horizontal position, shown in FIG. 8, to either a forward tilt position, shown in FIG. 9, or a rearward tilt position, shown in FIG. 10.

Figure 8:
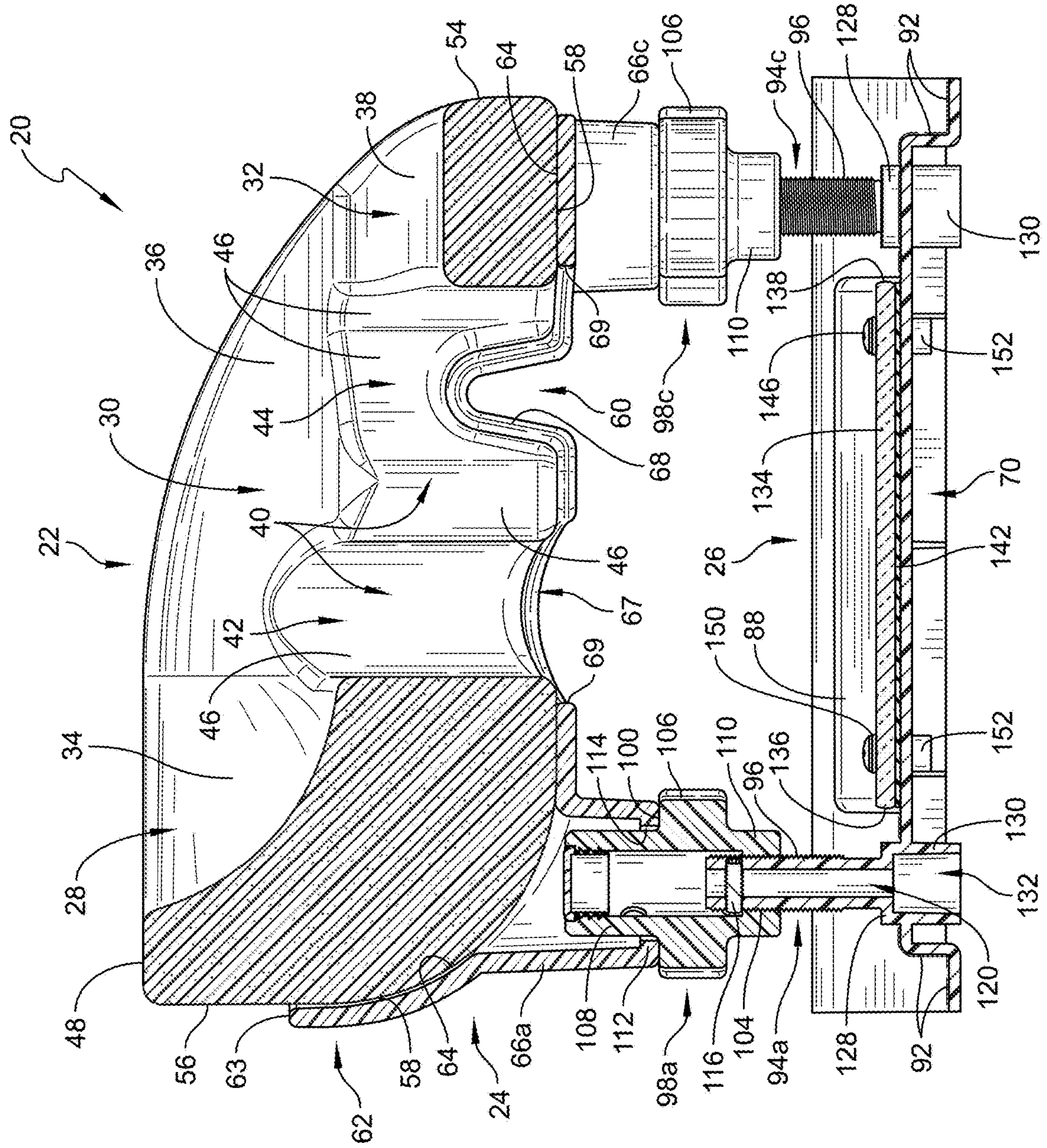
FIG. 8 is a cross sectional view, similar to FIG. 7, showing the knobs rotated on the upstanding posts into maximum raised positions having the threaded lower portions of the knobs moved into engagement with the pins.
Figure 9:
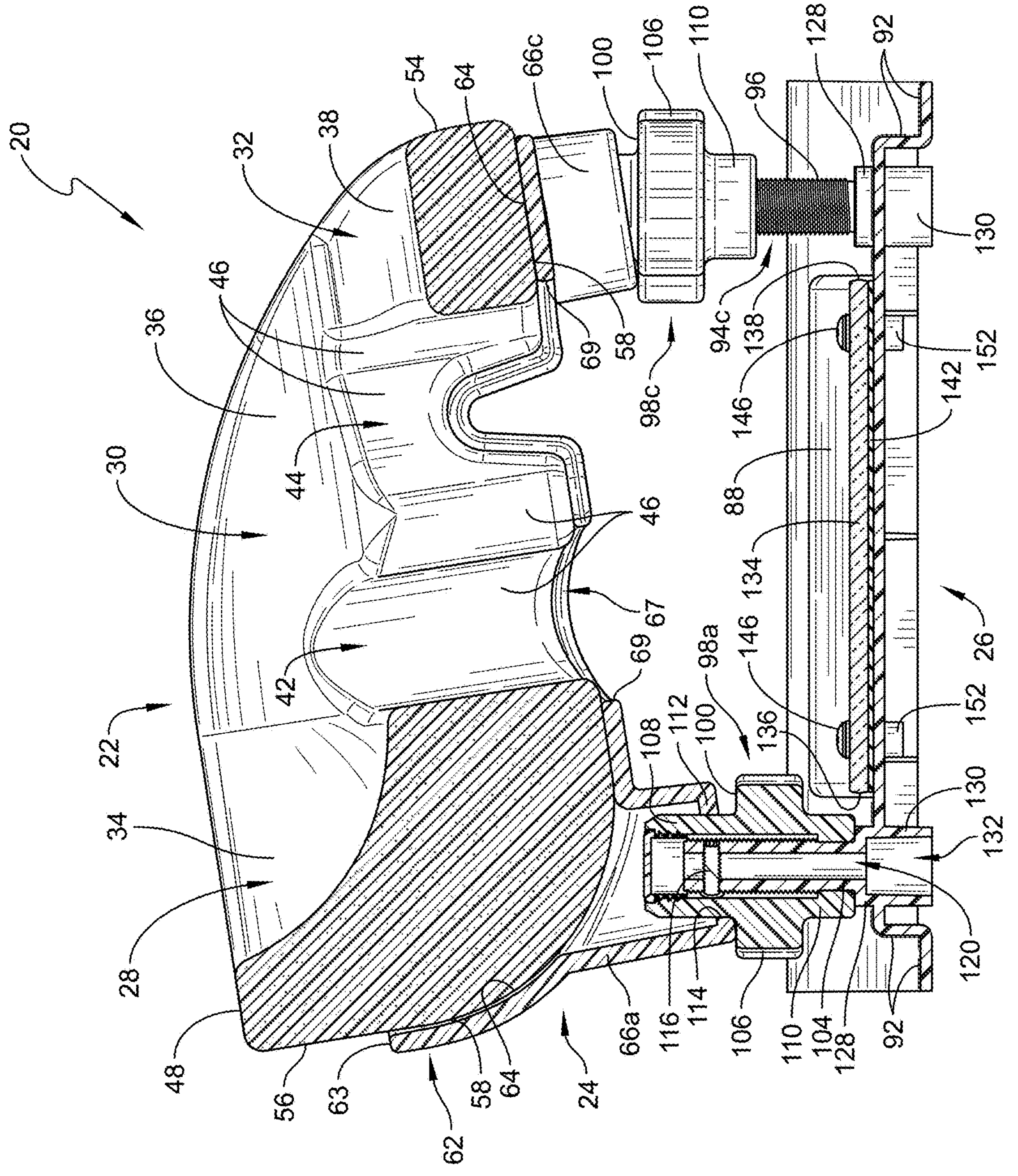
FIG. 9 is a cross sectional view, similar to FIG. 8, showing the head end knob rotated on the respective upstanding post into a lowered position such that the shell and foam cushion are in a maximum forward tilt position.
Figure 10:
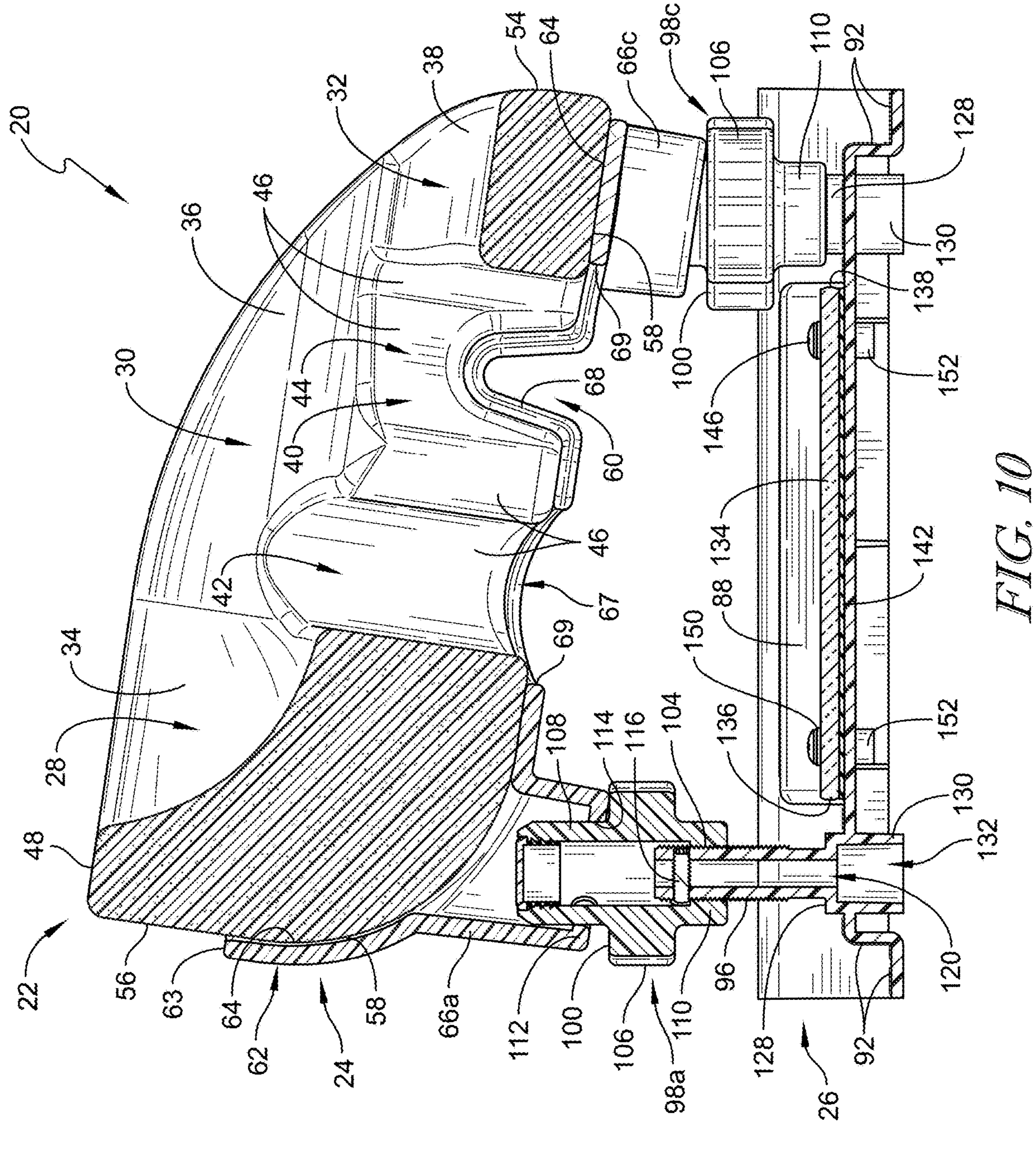
FIG. 10 is a cross sectional view, similar to FIG. 8, showing the foot end knobs rotated on the respective upstanding posts into respective lowered positions such that the shell and foam cushion are in a maximum rearward tilt position.

In the maximum forward tilt and maximum rearward tilt positions shown in FIGS. 9 and 10, respectively, shell 24 and cushion 22 have an angle of inclination of about 8.5 degrees relative to base panel 70 of tray 26 as compared to the horizontal positions shown in FIGS. 7 and 8 when base panel 70 of tray 26 is also horizontal. Shell 24 and cushion 22 are also movable to left tilt and right tilt positions relative to tray 26. For example, in FIG. 11, shell 24 and cushion 22 are moved to a right tilt position relative to tray 26 via appropriate rotational adjustment of knobs 98*a*, 98*b*, 98*c* along respective threaded posts 94*a*, 94*b*, 94*c*. A left tilt position is not shown but is similar to the right tilt position except that shell 24 and cushion 22 are tilted in the opposite direction from that shown in FIG. 11. In the maximum right tilt and maximum left tilt positions, shell 24 and cushion 22 have an angle of inclination of about 8.5 degrees relative to base panel 70 of tray 26 when base panel 70 of tray 26 is also horizontal. Compound tilting of shell 24 and cushion 22 in the longitudinal (e.g., fore-to-aft) and lateral (e.g., side-to-side) directions relative to tray 26 is also possible, such as tilting forwardly and to the right, or tilting rearwardly and to the left, just to give a couple of examples.

In the illustrative embodiment, prone head support 20 further includes a stop 116 coupled to each upstanding post 94*a*, 94*b*, 94*c* to prevent the corresponding knob 98*a*, 98*b*, 98*c* from being removable from the respective upstanding post 94*a*, 94*b*, 94*c*. In the illustrative example, each stop is embodied as a pin (sometimes referred to herein as pin 116) that is oriented generally perpendicular to the respective upstanding post 94*a*, 94*b*, 94*c* and that has either or both of its ends extending outwardly from the respective upstanding post 94*a*, 94*b*, 94*c*. Each upstanding post 94*a*, 94*b*, 94*c* has a hole 118 therein, as shown in FIG. 3, and the respective pin 116 is press fit into the corresponding hole 118. Furthermore, each hole 118 extends all the way through the respective upstanding post 94*a*, 94*b*, 94*c*. In the illustrative embodiment, each upstanding post 94*a*, 94*b*, 94*c* includes a bore 120 that extends generally coaxially therethrough and each hole 118 communicates with the respective bore 120. In particular, each hole 118 include first and second hole portions on opposite sides of the respective bore 120 and each pin 116 extends through the respective bore 120 between the first and second hole portions of the corresponding holes 118.

Still referring to FIG. 3, generally cylindrical protrusions 108 of each knob 98, 98*b*, 98*c* has an opening 122 therethrough into bore 102. During assembly of prone head support 20, knobs 98*a*, 98*b*, 98*c* are rotated into position on respective posts 94*a*, 94*b*, 94*c* until holes 122 are generally aligned with holes 118. Pins 116 are then inserted through openings 122 and into corresponding holes 118 until at least one end of each pin 116 extends beyond thread 96 of the respective post 94*a*, 94*b*, 94*c*. After pins 116 are in place, knobs 98*a*, 98*b*, 98*c* are blocked from removal from the respective posts 94*a*, 94*b*, 94*c* because threaded portions 104 of protrusions 110 of each knob 98*a*, 98*b*, 98*c* cannot advance upwardly beyond the corresponding pin 116. After installation of pins 116, set screws 124 are threaded into respective openings 122 to close the openings 122. Prone head support 20 further includes headed caps 126 that are press fit downwardly into bores 102 of protrusions 108 of respective knobs 98*a*, 98*b*, 98*c*. Caps 126 prevent fluids or other debris from falling downwardly into bores 102.

Upstanding posts 94*a*, 94*b*, 94*c* of tray 26 each includes an enlarged annular shoulder 128 interposed between the respective threaded portion (e.g., the portions of posts 94*a*, 94*b*, 94*c* having threads 96) and the base panel 70 as shown, for example, in FIG. 3. Shoulders 128 are integrally molded with base panel 70 and threaded portions of posts 94*a*, 94*b*, 94*c* as shown in FIGS. 7-11. Each adjuster 98*a*, 98*b*, 98*c* bottoms out against the respective annular shoulder 128 when rotated relative to the upstanding post 94*a*, 94*b*, 94*c* into a lowered position. More particularly, a bottom surface of protrusion 110 of knobs 98*a*, 98*b*, 98*c* bottoms out against an upper surface of the respective annular shoulder 128. Sidewalls of shoulders 128 are generally cylindrical in shape and tray 26 further includes cylindrical projections 130 extending downwardly from the underside of base panel 70 as shown in FIGS. 2 and 7-11. Projections 130 are integrally molded with base panel 70, have substantially the same inside and outside diameter as the sidewalls of shoulders 128, and are situated directly beneath shoulders 128. Each projection 130, shoulder 128, and portion of base panel 70 interposed therebetween is formed to include an enlarged bore 132 that communicates with the bore 120 of the corresponding upstanding post 94*a*, 94*b*, 94*c* as shown in FIGS. 7-11. Bores 120, 132 permit the passage of gases, such as air, therethrough during injection molding of tray 26.

In the illustrative embodiment, prone head support 20 further includes a mirror 134 coupled to base panel 70 of tray 26 beneath opening 40 of cushion 22 and opening 67 of shell 24. In the illustrative example, mirror 134 is generally rectangular in shape having a head end perimeter edge 136, a foot end perimeter edge 138, and a pair of side perimeter edges 140 extending between edges 136, 138, although the junctions between edges 136, 138 and 140 are rounded. Upstanding post 94*a* of tray 26 is outboard of head end perimeter edge 136 of mirror 136 and upstanding posts 94*b*, 94*c* of tray 26 are outboard of foot end perimeter edge 138 of mirror 134. That is, posts 94*a*, 94*b*, 94*c* are spaced apart from mirror 134 and, in fact, are spaced sufficiently far from mirror 134 that portions 110 of knobs 98*a*, 98*b*, 98*c* are also spaced from mirror 134 when knobs 98*a*, 98*b*, 98*c* are in their lowered positions. However, grip portions 106 of knobs 98*a*, 98*b*, 98*c* have small amounts that overhang mirror 134 but portions 106 are not able to be lowered enough to come into contact with mirror 134.

Prone head support 20 further include a resilient gasket 142 interposed between mirror 134 and base panel 70 of tray 26. In the illustrative example, resilient gasket 142 is embodied as a rubber sheet that directly underlies mirror 134 and that is similarly sized and shaped as the mirror 134, but has a smaller thickness than the mirror such as being half as thick or a quarter as thick. As shown in FIG. 3, mirror 134 and resilient gasket 142 each include a plurality of apertures 144 in their respective corner regions through which corresponding fastening screws 146 extend into respective threaded holes 148 formed in base panel 70 of tray 26. A washer 150 is provided between heads of each screw 146 and an upper surface of mirror 134. Four cylindrical projections 152, shown in FIG. 2, are molded integrally with base panel 70 of tray 26 on an underside thereof and threaded holes 148 each further extend downwardly through the respective projection 152 for receipt of lower end regions of screws 146.

In some embodiments, shell 24 and tray 26 are each made from NORYL™ GFN resin material which is a 30% glass fiber reinforced blend of polyphenylene ether and polystyrene. In some embodiments, knobs 98*a*, 98*b*, 98*c* are made from Acrylonitrile Butadiene Styrene (ABS) material. In some embodiments, mirror 134 is made from Acrylic Plastic and these are sometimes referred to as plexiglass mirrors. Foam cushion 22 is made from a closed cell foam in some embodiments and from an open cell foam in other embodiments. In some embodiments, gasket 142 is made from durometer 40A sponge silicone. Set screws 124, screws 146, and washers 150 are made from stainless steel in some embodiments. Pins 116 also may be made from stainless steel in some embodiments, but other metal materials may suffice just as well because pins 116 are totally surrounded by other elements of prone head support 20. Caps 126 are made from polyethylene plastic in some embodiments.

When terms of degree such as "generally," "substantially," and "about" are used herein in connection with a numerical value or a qualitative term susceptible to a numerical measurement (e.g., vertical, horizontal, aligned), it is contemplated that an amount that is plus or minus 10 percent, and possibly up to plus or minus 20 percent, of the numerical value, is covered by such language, unless specifically noted otherwise, to at least account for manufacturing tolerances. For example, "vertical" may be defined as 90 degrees from horizontal and so "substantially vertical" and "generally vertical" according to the present disclosure means 90 degrees plus or minus 9 degrees, and possibly up to plus or minus 18 degrees. The same tolerance range for "substantially horizontal" and "generally horizontal" is also contemplated. Otherwise, a suitable definition for "generally," "substantially," and "about" is largely, but not necessarily wholly, the term specified.

When the terms "a" or "an" or the phrases "one or more" or "at least one" are used herein, including in the claims, they are all intended to be synonymous and mean that one or more than one of the thing recited may be present. Similarly, when the phrases "a plurality" or "two or more" or "at least two" or "a pair" are used, they are all intended to be synonymous and mean that two or more than two of the thing recited may be present.

Although certain illustrative embodiments have been described in detail above, variations and modifications exist within the scope and spirit of this disclosure as described and as defined in the following claims.

The invention claimed is:

1. A prone head support comprising a cushion configured to support a face of a patient in a prone position, the cushion having a cutout configured to accommodate the patient's eyes, nose, and mouth, a shell including a main portion configured to cradle the cushion and a plurality of bosses extending downwardly from the main portion, the main portion of the shell including an opening beneath the cutout, a tray having a base panel and a plurality of upstanding posts extending upwardly therefrom, and a plurality of adjusters situated above the base panel, each adjuster being mounted on a respective one of the upstanding posts of the plurality of upstanding posts and movable upwardly and downwardly along the respective upstanding post in response to manual manipulation of the respective adjuster relative to the corresponding upstanding post, each adjuster being retained against removal from the respective upstanding post, each boss of the shell resting on a respective adjuster such that the shell is able to be freely lifted upwardly off of the plurality of adjusters regardless of the position of the adjusters along the respective upstanding posts, the plurality of adjusters each including undulated portions that extend radially outwardly beyond an overlying one of the bosses of the plurality bosses.

2. The prone head support of claim 1, wherein each upstanding post of the plurality of upstanding posts includes a helical thread and wherein each adjuster comprises a knob having a bore with a threaded portion that interfaces with the helical thread of the respective upstanding post.

3. The prone head support of claim 2, wherein each knob includes a grip portion having an upwardly facing shoulder surface and a generally cylindrical protrusion extending upwardly from the grip portion, wherein each boss includes an internal chamber in which a respective generally cylindrical protrusion is received, and wherein a lower end of each boss rests atop the upwardly facing shoulder surface of the respective grip portion.

4. A prone head support comprising a cushion configured to support a face of a patient in a prone position, the cushion having a cutout configured to accommodate the patient's eyes, nose, and mouth, a shell including a main portion configured to cradle the cushion and a plurality of bosses extending downwardly from the main portion, the main portion of the shell including an opening beneath the cutout, a tray having a base panel and a plurality of upstanding posts molded integrally with the base panel and extending upwardly therefrom, and a plurality of adjusters, each adjuster being mounted on a respective one of the upstanding posts of the plurality of upstanding posts and movable upwardly and downwardly along the respective upstanding post, each boss of the shell resting on a respective adjuster such that the shell is able to be freely lifted upwardly off of the plurality of adjusters regardless of the position of the adjusters along the respective upstanding posts, wherein each upstanding post of the plurality of upstanding posts includes a helical thread and wherein each adjuster comprises a knob having a bore with a threaded portion that interfaces with the helical thread of the respective upstanding post, wherein each knob includes a grip portion having an upwardly facing shoulder surface and a generally cylindrical protrusion extending upwardly from the grip portion, wherein each boss includes an internal chamber in which a respective generally cylindrical protrusion is received, and wherein a lower end of each boss rests atop the upwardly facing shoulder surface of the respective grip portion, wherein each boss includes a generally cylindrical wall and an annular flange at a lower end of the generally cylindrical wall that extends inwardly therefrom and wherein each annular flange has a generally circular inside edge that has a first diameter that is larger than a second diameter of the respective generally cylindrical protrusion of the knob to provide a gap between the generally circular inside edge and the associated generally cylindrical protrusion.

5. The prone head support of claim 2, further comprising a stop coupled to each upstanding post to prevent the respective knob from being removable from the respective upstanding post.

6. The prone head support of claim 5, wherein each stop comprises a pin that is oriented generally perpendicular to the respective upstanding post and having at least one end extending outwardly from the respective upstanding post.

7. The prone head support of claim 6, wherein each upstanding post has a hole therein and the respective pin is press fit into the corresponding hole.

8. The prone head support of claim 7, wherein each hole extends all the way through the respective upstanding post.

9. The prone head support of claim 7, wherein each upstanding post includes a bore extending generally coaxially therethrough and each hole communicates with the respective bore.

10. The prone head support of claim 9, wherein each hole includes first and second hole portions on opposite sides of the respective bore and wherein each pin extends through the bore between the first and second hole portions.

11. The prone head support of claim 1, wherein each upstanding post includes a threaded portion and an enlarged annular shoulder at its bottom end interposed between the threaded portion and the base panel and wherein each adjuster threadedly engages the threaded portion and bottoms out against an upper surface of the annular shoulder when rotated relative to the upstanding post into a lowered position.

12. The prone head support of claim 1, wherein the tray further includes first and second channel portions formed integrally with the base panel at opposite sides of the base panel, the first and second channel portions having open bottoms to permit the tray to be placed downwardly upon spaced apart rails of a surgical support apparatus with the spaced apart rails being received within channels of the respective first and second channel portions.

13. The prone head support of claim 12, further comprising first and second friction pads located within the channels of the respective first and second channel portions, the first and second friction pads being configured to inhibit sliding movement of the tray along the spaced apart rails of the surgical support apparatus.

14. The prone head support of claim 13, wherein the first and second friction pads are mounted to a corresponding undersurface of a respective top wall of the associated first and second channel portions.

15. The prone head support of claim 13, wherein the first and second friction pads comprise rubber friction pads.

16. The prone head support of claim 12, wherein the tray is formed to include first and second stiffening ramps molded integrally therewith and situated between an inwardly facing sidewall of the respective first and second channel members and the base panel.

17. The prone head support of claim 1, further comprising a mirror coupled to the base panel of the tray beneath the opening, at least one of the upstanding posts of the tray being outboard of a head end perimeter edge of the mirror, and at least another of the upstanding posts of the tray being outboard of a foot end perimeter edge of the mirror.

18. The prone head support of claim 17, further comprising a resilient gasket interposed between the mirror and the base panel of the tray.

19. The prone head support of claim 18, wherein the resilient gasket comprises a rubber sheet that underlies the mirror.

20. A prone head support comprising a cushion configured to support a face of a patient in a prone position, the cushion having a cutout configured to accommodate the patient's eyes, nose, and mouth, a shell including a main portion configured to cradle the cushion and a plurality of bosses extending downwardly from the main portion, the main portion of the shell including an opening beneath the cutout, a tray having a base panel and a plurality of upstanding posts molded integrally with the base panel and extending upwardly therefrom, a plurality of adjusters, each adjuster being mounted on a respective one of the upstanding posts of the plurality of upstanding posts and movable upwardly and downwardly along the respective upstanding post, each boss of the shell resting on a respective adjuster such that the shell is able to be freely lifted upwardly off of the plurality of adjusters regardless of the position of the adjusters along the respective upstanding posts, a mirror coupled to the base panel of the tray beneath the opening, at least one of the upstanding posts of the tray being outboard of a head end perimeter edge of the mirror, and at least another of the upstanding posts of the tray being outboard of a foot end perimeter edge of the mirror, and a resilient gasket interposed between the mirror and the base panel of the tray, wherein the mirror and the resilient gasket each include a plurality of apertures through which fastening screws extend into respective threaded holes formed in the base panel of the tray.

* * * * *